United States Patent
Eberlein et al.

(10) Patent No.: US 11,636,018 B1
(45) Date of Patent: Apr. 25, 2023

(54) ISSUE DETECTION SYSTEM

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/491,807

(22) Filed: Oct. 1, 2021

(51) Int. Cl.
  *G06F 11/00* (2006.01)
  *G06F 11/34* (2006.01)
  *G06F 11/07* (2006.01)
  *G06F 11/32* (2006.01)

(52) U.S. Cl.
  CPC ........ *G06F 11/3409* (2013.01); *G06F 11/076* (2013.01); *G06F 11/327* (2013.01); *G06F 2201/81* (2013.01); *G06F 2201/865* (2013.01); *G06F 2201/88* (2013.01)

(58) Field of Classification Search
  CPC .. G06F 11/3409; G06F 11/076; G06F 11/327; G06F 11/3414; G06F 11/0754; G06F 11/0751; G06F 11/328
  See application file for complete search history.

(56) References Cited

U.S. PATENT DOCUMENTS

| | | | | |
|---|---|---|---|---|
| 2010/0241905 | A1* | 9/2010 | Avritzer | G06F 11/1438 714/48 |
| 2016/0080229 | A1 | 3/2016 | Kobayashi et al. | |
| 2016/0124833 | A1 | 5/2016 | Cupta et al. | |
| 2020/0341830 | A1 | 10/2020 | Bangad et al. | |
| 2022/0121628 | A1* | 4/2022 | Devaraj | G06F 16/1824 |
| 2022/0318067 | A1* | 10/2022 | Nayak | G06F 9/4881 |

FOREIGN PATENT DOCUMENTS

CN      110888780 A      3/2020

OTHER PUBLICATIONS

Communication: "Extended European Search Report", dated Mar. 6, 2023 (Mar. 6, 202), European Patent Office, for European Application No. 22197725.9-1203, 9 pages.

* cited by examiner

*Primary Examiner* — Katherine Lin
(74) *Attorney, Agent, or Firm* — Buckley, Maschoff & Talwalkar LLC (57) ABSTRACT

Systems and methods include monitoring of one or more software applications to determine a value of a first metric associated with instances of a first process, the first process including steps executed by the one or more software applications, determination that the value of the first metric has exceeded a threshold associated with the first process in a first number of ongoing instances of the first process, determination that the first number is greater than a first count limit associated with the first process, and, in response to the determination that the first number is greater than the first count limit, sending of an error message to a user associated with each of the ongoing instances of the first process.

18 Claims, 8 Drawing Sheets

ISSUE DETECTION SYSTEM

BACKGROUND

Enterprise computing systems facilitate the performance of many processes within an enterprise. Despite best efforts, underlying technical issues may delay or prevent the completion of such processes. The technical issues may exist within different computing systems and may be sporadic or otherwise difficult to monitor and/or detect by the responsible technical support team.

When a process is delayed, stalled, or otherwise ill-performing, an affected user (e.g., the user who initiated the process) creates and submits a support ticket to the technical support team. A second user may later initiate the same process and eventually notice that the process is not executing properly, causing the second user to create and submit another support ticket. The support tickets are queued by the support team and the users are notified regarding the ongoing status of their respective tickets.

If the problem with the process is due to one or more underlying technical problems (e.g., a malfunctioning network connection), many users will be impacted and will create many support tickets. The large number of tickets may overwhelm the technical support team, which will continue to receive and queue new tickets while attempting to identify and resolve the issue. Meanwhile, overall user satisfaction decreases.

In one example, a company allows its employees to submit purchase requests for goods and services needed for their daily work. The purchasing of any item above a certain value must be approved by the manager of the employee who created the corresponding purchase request. Due to a recent configuration change, the rule which determines the manager of an employee based on organizational data begins to malfunction. Instead of determining the manager, the rule returns an empty result set. Consequently, no approval requests are sent and all purchase requests remain unapproved.

Since the determination rule continues to return a technically valid result, no technical problem is detected. A process monitoring solution may detect an increase in the average processing time for purchase request approvals, but such detection is not particularly helpful in detecting or triggering a resolution of the underlying technical issue. Consequently, the problem will only be detected after several employees independently notice an unusual delay, check with their manager, ask other colleagues if they have the same problem and finally create a support ticket.

Systems are desired to efficiently and proactively identify technical issues which disrupt operational processes and notify affected users, while limiting false notifications.

DETAILED DESCRIPTION

The following description is provided to enable any person in the art to make and use the described embodiments and sets forth the best mode contemplated for carrying out some embodiments. Various modifications, however, will be readily-apparent to those in the art.

Embodiments may reduce time and effort to detect technical issues which cause delays or failures of operational processes. By accelerating detection of such technical issues, associated notifications and resolution processes may be triggered faster than in prior systems.

Embodiments may detect an issue and, in response, initiate a resolution process and proactively notify users before the users manually create a pile-up of support tickets. Such features not only reduce the user overhead involved with detecting the issue and accelerate problem resolution, but also provide a swift indication to support personnel that an issue is not only related to one user-specific process but is likely more fundamental as it similarly affects a number of users and processes.

Detection of an issue according to some embodiments may include monitoring of processes to identify repeated violations of some process-related metric. Once the number of violations has reached a pre-defined limit, the affected users and a support team are notified of the violations. Moreover, each subsequent violation of the metric results in a notification to an associated user. These features may allow for fast clustering of related violations into single problems to be analyzed, thereby reducing the effort and redundant work required to resolve the problem.

Figure 1:
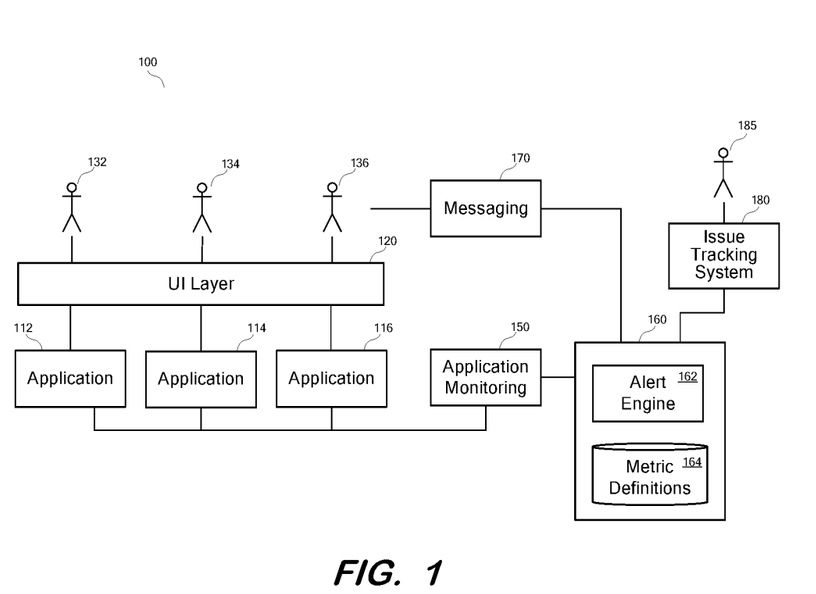
FIG. 1 is a block diagram of an architecture to detect and address potential issues in a technical layer by monitoring an application layer according to some embodiments.

FIG. 1 is a block diagram of an architecture of system 100 according to some embodiments. Each illustrated element of system 100 may be implemented using any suitable combination of computing hardware and/or software that is or becomes known. Such a combination may include implementations which apportion computing resources elastically according to demand, need, price, and/or any other metric. In some embodiments, two or more elements of system 100 are implemented by a single computing device. Two or more elements of system 100 may be co-located. One or more elements of system 100 may be implemented as a cloud service (e.g., Software-as-a-Service, Platform-as-a-Service).

Generally, system 100 operates to provide functionality to users 132, 134 and 136. Users 132, 134 and 136 access software-implemented logic of applications 112, 114 and 116 to receive this functionality. Applications 112, 114 and 116 may comprise any software applications that are or become known.

In one non-exhaustive example, applications 112, 114 and 116 comprise a customer relationship management application, a human resource management application and a supplier relationship management application operated by a single enterprise. Users 132, 134 and 136 may comprise employees of the enterprise, and each of users 132, 134 and 136 may be authorized to access one or more of applications 112, 114 and 116. Each of users 132, 134 and 136 may have access to different data via applications 112, 114 and 116, depending on the relative permissions granted to each of users 132, 134 and 136.

Applications 112, 114 and 116 communicate with and utilize underlying platforms and infrastructure (not shown) as is known in the art. Such platforms and infrastructure include but are not limited to servers (standalone or executing within virtual machines) protocols, networks, databases, data centers, etc.

Users 132, 134 and 136 interact with applications 112, 114 and 116 via user interface (UI) layer 120. UI layer 120 may present user interfaces which are manipulated by users 132, 134 and 136 to access functionality of applications 112, 114 and 116. UI layer 120 may alternatively provide an entry point to individual UI components (not shown) of applications 112, 114 and 116.

Application monitoring component 150 may operate to receive data from applications 112, 114 and 116. Based on the data and as is known in the art, application monitoring component 150 may determine that a desired key performance indicator (KPI) value has not been met (e.g., process A was not completed within 7 days) and send a notice to the user who initiated the corresponding process. Such conventional operation is similar to that described in the above Background, and requires the user to either diagnose and resolve the problem with the particular process (e.g., an e-mail was never read by an intended recipient) or determine that the KPI value has not been met due to a technical issue and generate a corresponding support ticket.

Issue notification system 160 receives application monitoring data from application monitoring component 150. Based on this data and on metric definitions 164, alert engine 162 identifies potential technical issues and sends corresponding notifications to affected users and to issue tracking system 180 as will be described in detail below. Embodiments may therefore execute in parallel with conventional application process monitoring systems.

Metrics defined by metric definitions 164 may be time-based (e.g., a processing time of process A), occurrence-based (e.g., a number of failed software module deployments), or otherwise-based. Each metric is associated with both a threshold and a count limit as will be described. The metrics may include KPIs defined and monitored during normal operation of system 100, but embodiments are not limited thereto.

The threshold associated with a metric may be consistent with a threshold specified by applicable Service Level Agreements (SLAs), but again embodiments are not limited thereto. For example, metric definitions 164 may define a metric associated with completion of a particular process. An operative SLA may require that the process be completed within one day, and other systems may operate to monitor compliance with this requirement, but the threshold associated with the metric in metric definitions 164 may be 18 hours.

Issue tracking system 180 is operated by a technical support team represented by user 185 in FIG. 1. Issue notification system 160 may communicate with issue tracking system 180 via an interface provided by issue tracking system 180 to notify system 180 of a potential technical issue as described below. Issue notification system 160 may similarly communicate with messaging component 170 (e.g., an e-mail server) to send notifications to affected users according to the algorithms described herein.

Figure 2:
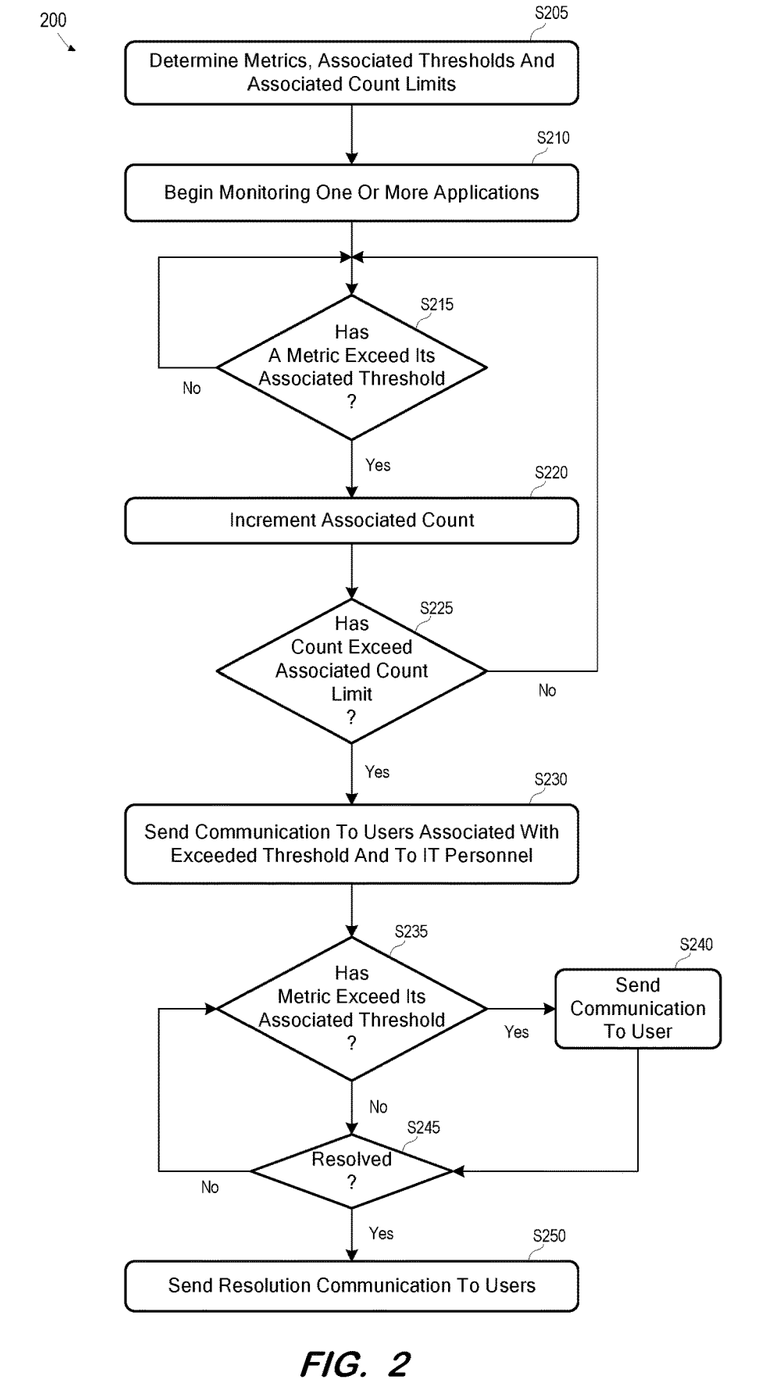
FIG. 2 comprises a flow diagram of a process to detect and address potential issues in a technical layer by monitoring an application layer according to some embodiments.

FIG. 2 comprises a flow diagram of process 200 to efficiently detect and provide notifications of technical issues according to some embodiments. Process 200 and all other processes mentioned herein may be embodied in program code executable by one or more processing units (e.g., processor, processor core, processor thread) and read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

One or more metrics are initially determined at S205. Each metric is associated with a respective threshold and count limit, the relevances of which will be described below. Each determined metric and its threshold and count limit may be stored in metric definitions 164 of issue notification system 160.

An initial set of metrics may be determined by a developer of issue notification system 160 and/or developers of applications 112, 114 and 116. These metrics may include KPIs which are monitored by other application monitoring systems deployed in system 100, and the associated thresholds may be equal to thresholds required by applicable SLAs. Determined thresholds may be stricter than those required by SLAs based on historical performance data, as will be described below. Metrics, their associated thresholds, or their associated count limits may be modified, added or deleted as desired (e.g., by an administrator or certain users) according to some embodiments.

Monitoring of one or more applications begins at S210. The monitored applications are those applications whose monitoring is required to determine whether the metrics determined at S205 meet their respective thresholds. For example, if the time required to complete an approval process is a metric, an application which governs the approval process is monitored at S210.

Next, at S215, it is determined whether a metric has exceeded its associated threshold in an ongoing instance of the process. It should be noted that S215 through S250 If not, flow cycles at S215 until it is determined that a metric has exceeded its associated threshold. Flow then proceeds to S220 to increment a count associated with the metric. At S225, it is determined whether the count has exceeded the count limit associated with the metric. If not, flow returns to S215 and continues as described above.

FIGS. 3 through 7 illustrate execution timelines for several ongoing instances of a same process according to some embodiments. The execution timelines are intended to provide an example of process 200 according to some embodiments.

Figure 3:
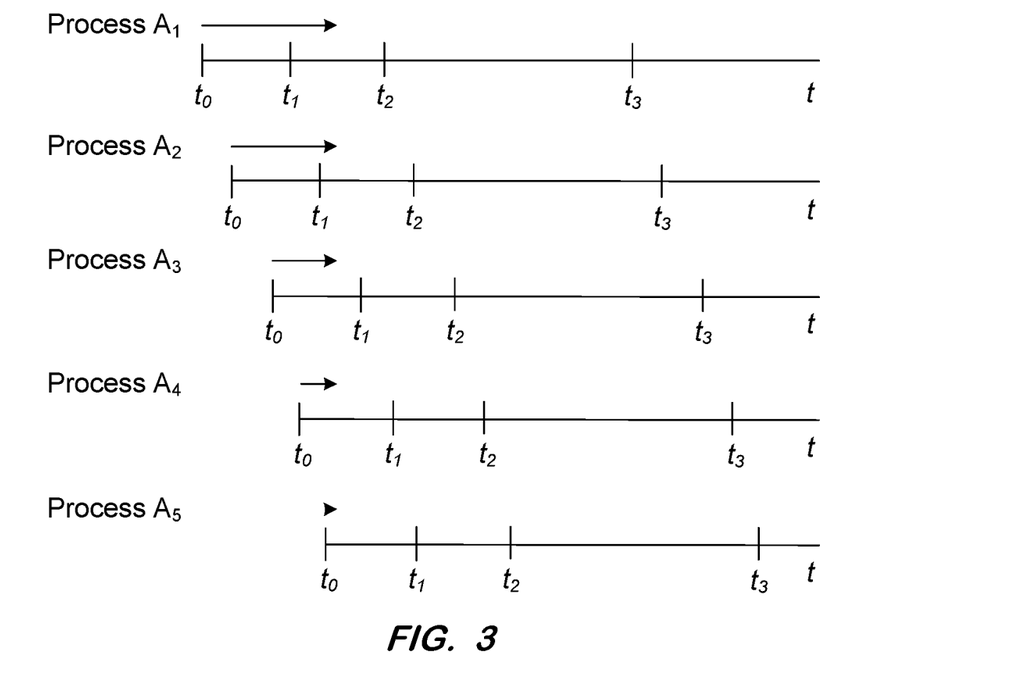
FIGS. 3 through 7 illustrate monitoring of application processes and issuance of user notifications over time according to some embodiments.

FIG. 3 shows commencement of each of processes $A_1$ through $A_5$. The progress of each process is ongoing and is represented by an arrow in relation to its starting at to of its own timeframe. Accordingly, even though the relative time differences between $t_0$, $t_1$, $t_2$ and $t_3$ on each timeline are equal, $t_0$, of process $A_5$ occurs after $t_1$ of process $A_1$.

For purposes of the present explanation, it will be assumed that the threshold time associated with completion of process A is $t_2$. It will also be assumed that the applicable SLA requires completion of process A by $t_3$. Accordingly, at the time represented by FIG. 3, it would be determined at S215 that the metric has not exceeded its threshold because, at that time, no instance of process A has taken longer than $t_2$ to complete.

Figure 4:
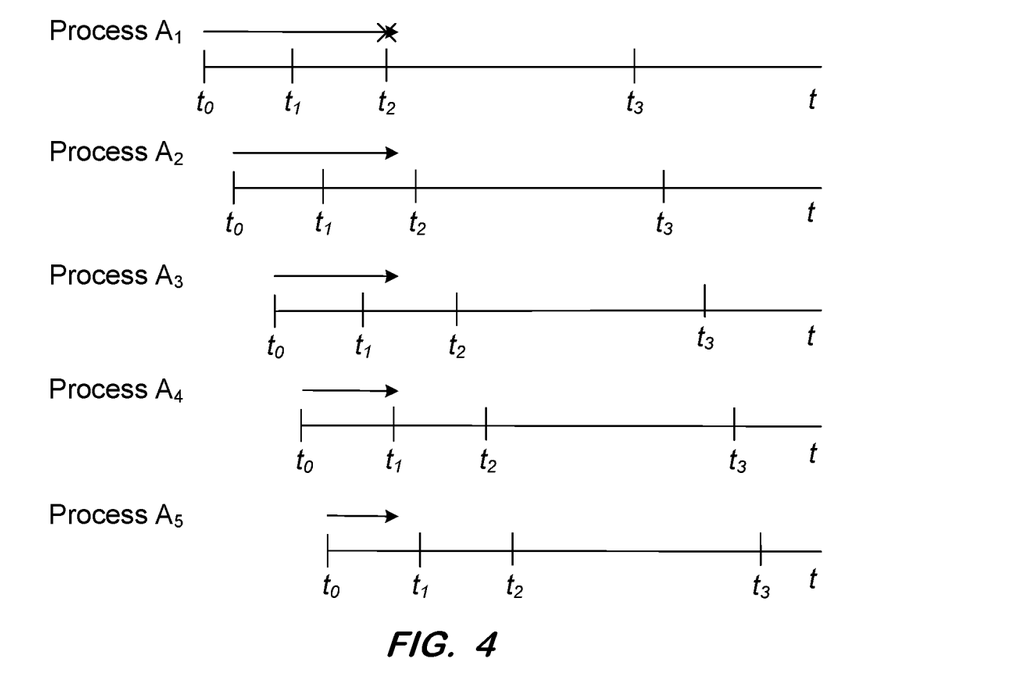

Moving to FIG. 4, process $A_1$ has not completed by $t_2$, as denoted by the "x". A counter associated with completion of process A is therefore incremented to 1 at S220. It will be assumed that the count limit associated with completion of process A (and determined at S205) is 2. Accordingly, process $A_1$ and the remaining instances of process A continue to execute and flow returns from S225 to S215.

Figure 5:
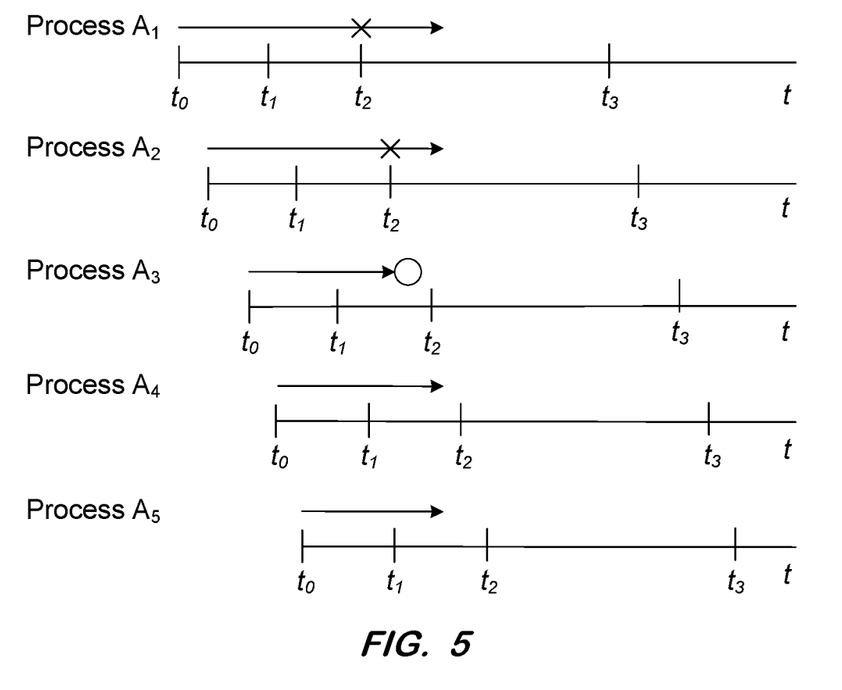
Figure 6:
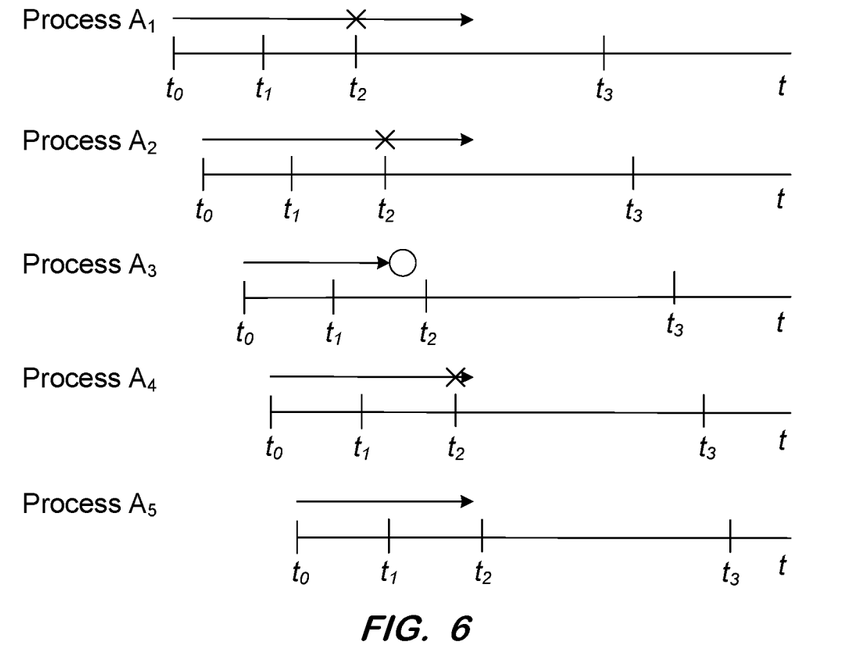

At the time shown in FIG. 5, it is noted that process $A_2$ has not completed by $t_2$ (as also denoted by an "x") and process $A_3$ has completed by $t_2$ (annotated with an "o"). The counter associated with completion of process A is therefore incremented to 2 at S220. Since the count limit associated with completion of process A is 2 and has not been exceeded, flow again returns from S225 to S215. Time passes until the time shown in FIG. 6, at which it is determined that process $A_4$ has not completed by $t_2$. The counter associated with completion of process A is therefore incremented to 3 at S220. Flow then proceeds to S230 since the count limit associated with completion of process A has been exceeded.

At S230, a communication is sent to each user associated with an exceeded threshold and to technical support personnel. With respect to the example of FIGS. 3 through 6, a communication is sent to the users who initiated processes $A_1$, $A_2$, and $A_4$ and to technical support personnel. In some embodiments, alert engine 162 instructs messaging component 170 to transmit an e-mail to the appropriate users and communicates with issue tracking system 180 to open a single corresponding ticket. The e-mail to the users may comprise an error message, and may indicate, for example, that an underlying technical problem has been identified, that support personnel have been notified, and that the users will be kept apprised of the status of the technical problem.

The foregoing provides several advantages over prior systems. First, the users are notified even before a corresponding SLA (i.e., completion before $t_2$) has been violated. Second, the users are notified before they would likely otherwise have generated a support ticket, thereby saving user effort. Third, the technical support team receives a single support ticket rather than multiple support tickets associated with a (likely) same underlying problem.

After sending of the communications at S230, process 200 continues to monitor at S235 whether the threshold associated with the metric has been exceeded. If not, it is determined at S245 whether the issue has been resolved. The determination at S245 may be based on a communication received from the technical support team indicating that the issue has been resolved, a determination that the metric has not exceeded its threshold for a given amount of time and/or number of occurrences, and/or any other basis. Flow returns to S235 if the issue has not been resolved.

If it is determined at S235 that the metric has exceeded its threshold, a communication is sent to a corresponding user at S240. The communication may be similar to the communication sent to the users at S230. In some embodiments, no communication is sent to the technical support team at S240 due to the support ticket which was already opened at S230.

Figure 7:
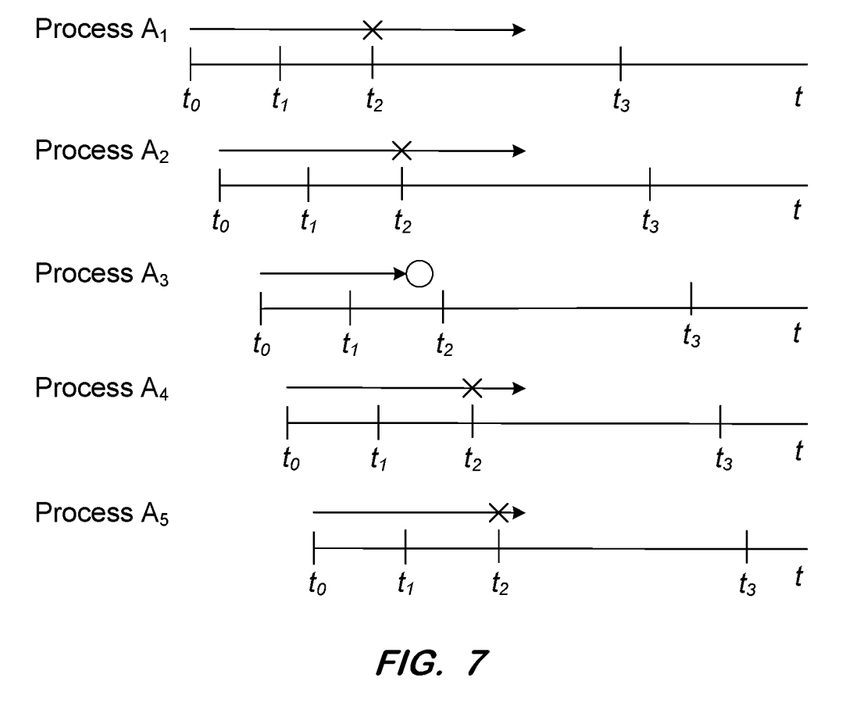

FIG. 7 illustrates a scenario in which process $A_5$ is determined to have exceeded time $t_2$ at S235. Accordingly, a communication is sent to a corresponding user at S240. The communication is sent without regard to the count limit because it has already been determined that a potential technical problem is present. Flow continues to cycle in this manner between S235, S240 and S245 until it is determined at S245 that the issue has been resolved. Then, at S250, a communication indicating that the issue has been resolved is sent to all users who have previously received a communication per process 200.

According to some embodiments, S250 includes actions to confirm that the issue has been resolved. For example, upon resolution of the ticket, issue tracking system 180 notifies system 160, as the submitter of the support ticket. System 160 continues to monitor the corresponding metric to determine whether the percentage of exceeded thresholds decreases (e.g., to 50% of the pre-notification rate). If so, the users are notified as described above. If not, the ticket is re-opened and the users are notified that the problem has not been resolved.

For simplicity, S215 through S250 are described above with respect to a single metric. It should be noted that more than one metric may be evaluated at S215, and, whenever a metric is determined to exceed its threshold, the remaining steps of process 200 are executed for that metric while S215 continues to evaluate other metrics which have not exceeded their respective thresholds.

The threshold associated with a metric determines the time at which a problem is identified. A low threshold ensures that the problem does not remain "undetected" for too long. On the other hand, if delays regularly occur without any corresponding technical issue, it is desirable to increase the threshold to avoid false positives.

According to some embodiments, a threshold may be defined in terms of historical performance. This definition may be rule-based and the threshold may be periodically re-calculated based on the definition. In one example, the threshold is defined in terms of historical runtimes. For instance, the threshold may be defined as the process runtime in which 95% of the processes are completed. Such an approach may minimize false positives while still detecting actual problems. This value may be increased (e.g., to 98%, 99%) if analysis costs are of more concern than timely identification of an issue, or decreased (e.g., to 65%) if early issue detection is more important.

Figure 8:
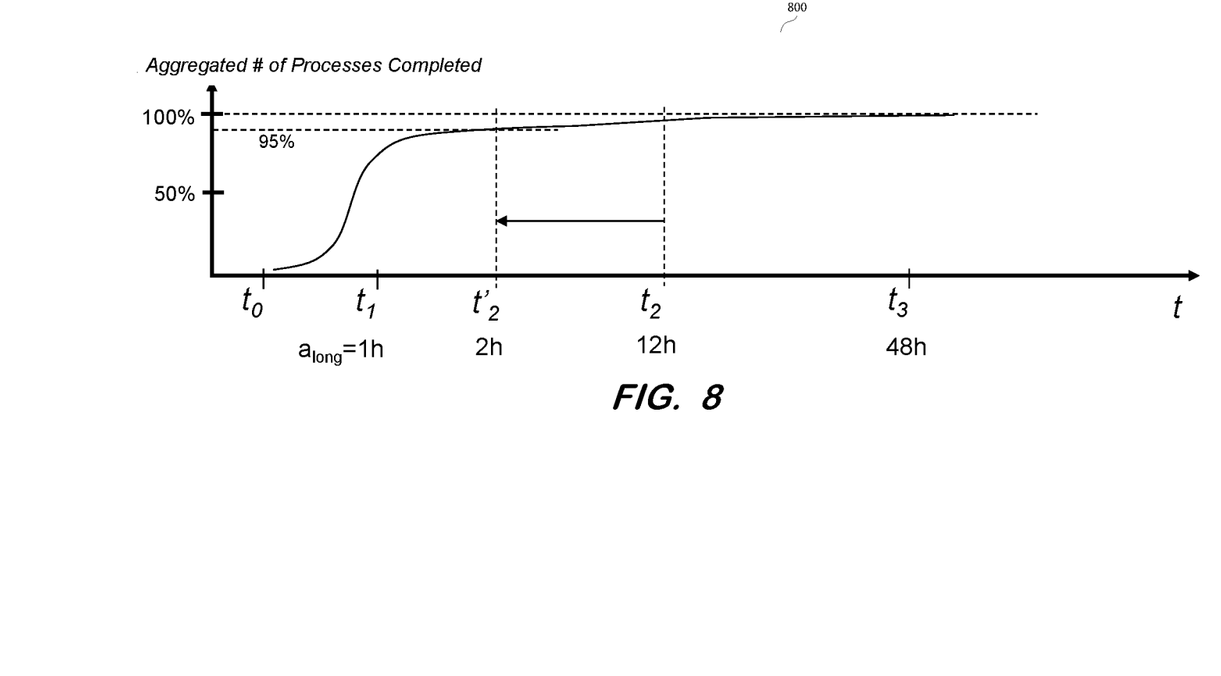
FIG. 8 illustrates setting of a metric threshold for application monitoring according to some embodiments.

FIG. 8 illustrates the setting of a threshold associated with a metric according to some embodiments. The metric is the completion of a particular process, and graph 800 illustrates the percentage of initiated processes completed over time. It will be assumed that graph 800 indicates that 98% of initiated processes complete by time $t_2$, and that the current threshold associated with the metric is time $t_2$. It may be desired to decrease the completion percentage to 95%. Since this value corresponds to time $t_2'$, the threshold associated with the metric is decreased to $t_2'$.

Similarly, the count limit for a particular metric may be fixed or variable. Setting of the count limit may depend on the frequency with which the corresponding process is executed. Specifically, processes that are initiated very frequently will quickly reach a low count limit and should be associated with a higher count limit, while processes initiated infrequently might be associated with lower count limits to reduce the time until a corresponding technical issue is detected.

Figure 9:
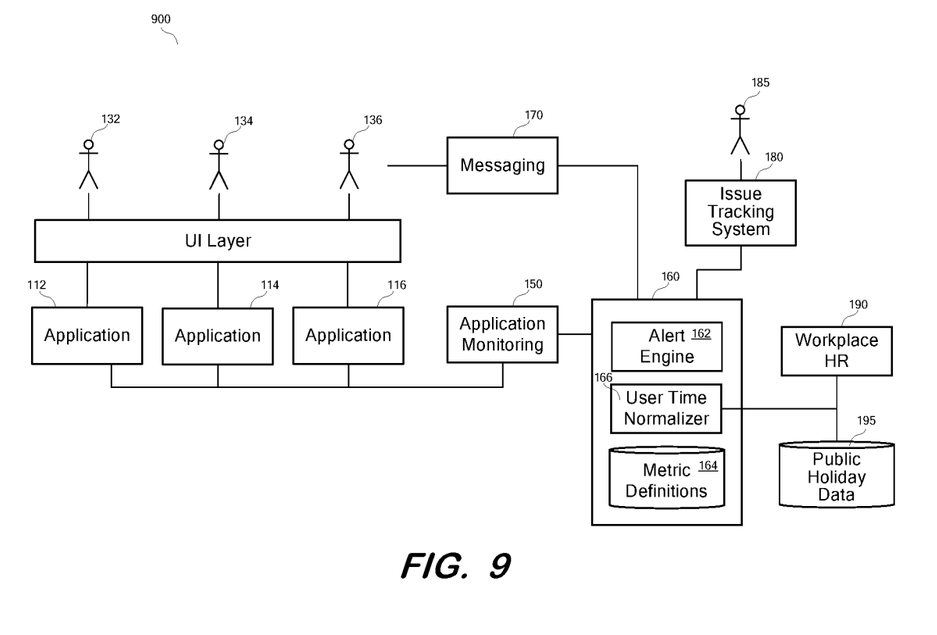
FIG. 9 is a block diagram of an architecture to detect and address potential issues in a technical layer by monitoring an application layer and based on user working hours according to some embodiments.

FIG. 9 illustrates architecture 900, where like components are numbered identically to their corresponding components in FIG. 1. Architecture 900 further includes user time normalizer 166, workplace human resources system 190 and public holiday data 195. User time normalizer 166 may communicate with workplace human resources system 190 and public holiday data 195 to assist alert engine 162 in taking "working hours" into account during the evaluation of metric thresholds. Since embodiments compare overall process time to thresholds in order to detect technical issues, it may be beneficial to ignore non-working hours (e.g., weekends, holidays, vacation days, sick days, etc.) in the overall process time since those hours are typically not relevant to whether or not a technical issue exists.

For example, if a message is sent shortly before the end of business hours, and a recipient user timely reacts the next morning, the intervening hours should not be considered as part of overall process time, particularly as compared to hours elapsing between a request sent at the beginning of the work day for which no response is received until the end of the work day. Similar considerations apply if a message is sent at the end of day Friday and the recipient user responds the following Monday morning.

In the latter case, the days of the work week and work holidays depend on the region in which the user is working. The location of the user can be acquired from workplace HR system 190 and the days of the work week and work holidays for that location may be read from public holiday data 195. The location will also establish the user time zone and will allow exclusion of the corresponding non-working hours from the overall process time. Workplace HR system 190 may also provide user-specific holiday periods to exclude.

According to some embodiments, the working hours of a user can be derived from the login-time of a system in which the user regularly works. Such a feature may be beneficial to determine overall process time in the case of part-time users or users working overtime.

Figure 10:
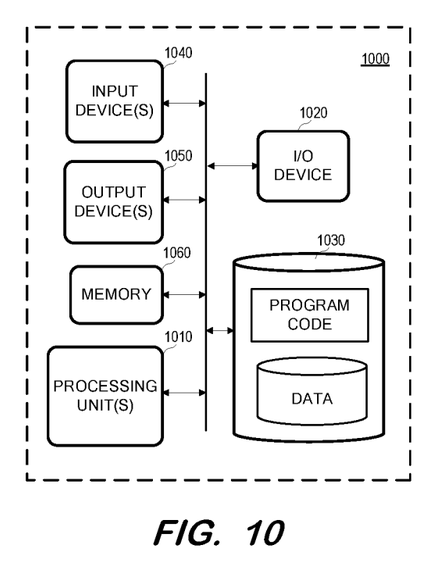
FIG. 10 is a block diagram of a hardware system according to some embodiments.

FIG. 10 is a block diagram of a computing system according to some embodiments. System 1000 may comprise a general-purpose computing apparatus and may execute program code to perform any of the functions described herein, including but not limited to process 200. System 1000 may be implemented by a standalone computing device, a distributed cloud-based server, or other system and may include other unshown elements according to some embodiments.

System 1000 includes processing unit(s) 1010 operatively coupled to an I/O device 1020, data storage device 1030, one or more input devices 1040, one or more output devices 1050 and memory 1060. I/O device 1020 may facilitate communication with external devices, such as an external network, the cloud, or a data storage device. Input device(s) 1040 may comprise, for example, a keyboard, a keypad, a mouse or other pointing device, a microphone, knob or a switch, an infra-red (IR) port, a docking station, and/or a touch screen. Input device(s) 1040 may be used, for example, to enter information into system 1000. Output device(s) 1050 may comprise, for example, a display (e.g., a display screen) a speaker, and/or a printer.

Data storage device 1030 may comprise any appropriate persistent storage device, including combinations of magnetic storage devices (e.g., magnetic tape, hard disk drives and flash memory), optical storage devices, Read Only Memory (ROM) devices, and RAM devices, while memory 1060 may comprise a RAM device.

Data storage device 1030 stores program code executed by processing unit(s) 1010 to cause system 1000 to implement any of the components and execute any one or more of the processes described herein. Embodiments are not limited to execution of these processes by a single computing device. Data storage device 1030 may also store data and other program code for providing additional functionality and/or which are necessary for operation of system 1000, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A method comprising:
monitoring one or more software applications;
determining a value of a first metric associated with each of a plurality of ongoing instances of a first process, the plurality of ongoing instances of the first process comprising a first instance, a second instance, and a third one or more other instances, and the first process including steps executed by the one or more software applications and each of the plurality of ongoing instances of the first process associated with a respective different user;
incrementing a count in response to determining that the value of the first metric has exceeded a threshold associated with the first process in the first instance of the first process;
incrementing the count in response to determining that the value of the first metric in the second instance of the first process has exceeded the threshold associated with the first process;
determining that the count is greater than a first count limit associated with the first process; and
in response to determining that the count is greater than the first count limit, sending an error message to the respective different users associated with each of the third one or more other instances of the first process.

2. A method according to claim 1, further comprising:
in response to determining that the count is greater than the first count limit, sending the error message associated with the first process to a technical support department.

3. A method according to claim 1, further comprising:
after sending the error messages, determining that the value of the first metric has exceeded the threshold in the second instance of the first process; and
in response to determining that the value of the first metric has exceeded the threshold in the second instance of the first process, sending an error message to a user associated with the second instance of the first process.

4. A method according to claim 1, wherein determining that value of the first metric has exceeded a threshold associated with the first process in the first ongoing instance of the first process comprises determining working hours of a user associated with the ongoing instance of the first process.

5. A method according to claim 1, further comprising:
determining a value of a second metric associated with each of a plurality of ongoing instances of a second process, the second process including steps executed by the one or more software applications and each of the plurality of ongoing instances of the second process associated with a respective different second user;
incrementing a second count in response to determining that the value of the second metric has exceeded a second threshold associated with the second process in a first instance of the second process;

determining that the second count is greater than a second count limit associated with the second process; and in response to determining that the second count is greater than the second count limit, sending an error message to each respective different second user associated with each of the plurality of ongoing instances of the second process other than the first ongoing instance of the second process.

6. A method according to claim 5, further comprising:

after sending the error message to each respective different user associated with each of the third one or more other instances of the first process, determining that the value of the first metric has exceeded the threshold in the second instance of the first process;

in response to determining that the value of the first metric has exceeded the threshold in the second instance of the first process, sending an error message to a user associated with the second instance of the first process;

after sending the error message to each respective different second user associated with each of the plurality of ongoing instances of the second process, determining that the value of the second metric has exceeded the second threshold in a second ongoing instance of the second process; and in response to determining that the value of the second metric has exceeded the second threshold in the second ongoing instance of the second process, sending an error message to a user associated with the second ongoing instance of the second process.

7. A non-transitory computer-readable medium storing program code executable by a processing unit to cause a computing system to:

monitor one or more software applications;

determine a value of a first metric associated with each of a plurality of ongoing instances of a first process, the plurality of ongoing instances of the first process comprising a first instance, a second instance, and a third one or more other instances, and the first process including steps executed by the one or more software applications and each of the plurality of ongoing instances of the first process associated with a respective different user;

increment a count in response to determining that the value of the first metric has exceeded a threshold associated with the first process in the first instance of the first process;

increment the count in response to determining that the value of the first metric has exceeded the threshold associated with the first process in the second instance of the first process;

determine that the count is greater than a first count limit associated with the first process; and in response to the determination that the count is greater than the first count limit, send an error message to each respective different user associated with each of the third one or more other instances of the first process.

8. A medium according to claim 7, the program code further executable by a processing unit to cause a computing system to:

in response to the determination that the count is greater than the first count limit, send the error message associated with the first process to a technical support department.

9. A medium according to claim 7, the program code further executable by a processing unit to cause a computing system to:

after sending of the error messages, determine that the value of the first metric has exceeded the threshold in a the instance of the first process; and in response to the determination that the value of the first metric has exceeded the threshold in the second instance of the first process, send an error message to a user associated with the second instance of the first process.

10. A medium according to claim 7, wherein the determination that value of the first metric has exceeded a threshold associated with the first process in the first ongoing instance of the first process comprises determination of working hours of a user associated with the ongoing instance of the first process.

11. A medium according to claim 7, the program code further executable by a processing unit to cause a computing system to:

determine a value of a second metric associated with each of a plurality of ongoing instances of a second process, the second process including steps executed by the one or more software applications and each of the plurality of ongoing instances of the second process associated with a respective different second user;

increment a second count in response to determining that the value of the second metric has exceeded a second threshold associated with the second process in a first instance of the second process;

determine that the second count is greater than a second count limit associated with the second process; and in response to the determination that the second count is greater than the second count limit, send an error message to each respective different second user associated with each of the plurality of ongoing instances of the second process other than the first ongoing instance of the second process.

12. A medium according to claim 11, the program code further executable by a processing unit to cause a computing system to:

after sending of the error message to each respective different user associated with each of the third one or more other instances of the first process, determine that the value of the first metric has exceeded the threshold in the second instance of the first process;

in response to the determination that the value of the first metric has exceeded the threshold in the second instance of the first process, send an error message to a user associated with the second instance of the first process;

after sending of the error message to each respective different second user associated with each of the plurality of ongoing instances of the second process, determine that the value of the second metric has exceeded the second threshold in a second ongoing instance of the second process; and in response to the determination that the value of the second metric has exceeded the second threshold in the second ongoing instance of the second process, send an error message to a user associated with the second ongoing instance of the second process.

13. A system comprising:

one or more processing units; and a memory storing program code executable by the one or more processing units to cause the computing system to:

monitor one or more software applications;
determine a value of a first metric associated with each of a plurality of ongoing instances of a first process, the plurality of ongoing instances of the first process comprising a first instance, a second instance, and a third one or more other instances, and the first process including steps executed by the one or more software applications and each of the plurality of ongoing instances of the first process associated with a respective different user;
increment a count in response to determining that the value of the first metric has exceeded a threshold associated with the first process in the first instance of the first process;
increment the count in response to determining that the value of the first metric has exceeded the threshold associated with the first process in the second instance of the first process;
determine that the count is greater than a first count limit associated with the first process; and
in response to the determination that the count is greater than the first count limit, send an error message to each respective different user associated with each of the third one or more other instances of the first process.

14. A system according to claim 13, the program code executable by the one or more processing units to cause the computing system to:
in response to the determination that the count is greater than the first count limit, send the error message associated with the first process to a technical support department.

15. A system according to claim 13, the program code executable by the one or more processing units to cause the computing system to:
after sending of the error messages, determine that the value of the first metric has exceeded the threshold in the second instance of the first process; and
in response to the determination that the value of the first metric has exceeded the threshold in the second instance of the first process, send an error message to a user associated with the second instance of the first process.

16. A system according to claim 13, wherein the determination that value of the first metric has exceeded a threshold associated with the first process in the first ongoing instance of the first process comprises determination of working hours of a user associated with the ongoing instance of the first process.

17. A system according to claim 13, the program code executable by the one or more processing units to cause the computing system to:
determine a value of a second metric associated with each of a plurality of ongoing instances of a second process, the second process including steps executed by the one or more software applications and each of the plurality of ongoing instances of the second process associated with a respective different second user;
increment a second count in response to determining that the value of the second metric has exceeded a second threshold associated with the second process in a first instance of the second process;
determine that the second count is greater than a second count limit associated with the second process; and
in response to the determination that the second count is greater than the second count limit, send an error message to each respective different second user associated with each of the plurality of ongoing instances of the second process other than the first ongoing instance of the second process.

18. A system according to claim 17, the program code executable by the one or more processing units to cause the computing system to:
after sending of the error message to each respective different user associated with each of the third one or more other instances of the first process, determine that the value of the first metric has exceeded the threshold in the second instance of the first process;
in response to the determination that the value of the first metric has exceeded the threshold in the second instance of the first process, send an error message to a user associated with the second instance of the first process;
after sending of the error message to each respective different second user associated with each of the plurality of ongoing instances of the second process, determine that the value of the second metric has exceeded the second threshold in a second ongoing instance of the second process; and
in response to the determination that the value of the second metric has exceeded the second threshold in the second ongoing instance of the second process, send an error message to a user associated with the second ongoing instance of the second process.

\* \* \* \* \*